United States Patent
Gross et al.

(10) Patent No.: US 8,447,564 B2
(45) Date of Patent: May 21, 2013

(54) SYSTEMS AND METHOD FOR POWER PLANT PERFORMANCE RECONCILIATION

(75) Inventors: Michael Jay Gross, Moreland Hills, OH (US); Jagadish Nanjappa, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 12/490,977

(22) Filed: Jun. 24, 2009

(65) Prior Publication Data

US 2010/0332187 A1 Dec. 30, 2010

(51) Int. Cl.
*G21C 17/00* (2006.01)

(52) U.S. Cl.
USPC ............. 702/182; 702/81; 702/84; 702/130

(58) Field of Classification Search
USPC ............. 702/81, 84, 99, 130, 182, 183, 184
See application file for complete search history.

(56) References Cited

U.S. PATENT DOCUMENTS

| | | | |
|---|---|---|---|
| 5,331,579 A | 7/1994 | Maguire, Jr. et al. | |
| 5,347,466 A | 9/1994 | Nichols et al. | |
| 6,591,225 B1 | 7/2003 | Adelman et al. | |
| 6,681,155 B1 | 1/2004 | Fujita et al. | |
| 6,785,633 B2 * | 8/2004 | Patanian et al. | 702/182 |
| 7,058,552 B2 | 6/2006 | Stothert et al. | |
| 7,096,156 B2 | 8/2006 | Hosaka et al. | |
| 7,356,383 B2 | 4/2008 | Pechtl et al. | |
| 7,383,167 B2 | 6/2008 | Oke | |
| 2003/0063702 A1 | 4/2003 | Kruger et al. | |
| 2003/0083827 A1 | 5/2003 | Chow et al. | |
| 2009/0043539 A1 * | 2/2009 | Frank et al. | 702/183 |
| 2009/0254569 A1 * | 10/2009 | Paulk et al. | 707/10 |

* cited by examiner

*Primary Examiner* — Alexander H Taningco
*Assistant Examiner* — Paul D Lee
(74) *Attorney, Agent, or Firm* — Armstrong Teasdale LLP (57) ABSTRACT

A method and system for determining the overall performance of a power plant are provided. The system includes a plurality of components including a processor configured to generate a first reference model of the power plant and generate a first measured model of the power plant. The processor is further configured to determine the performance impact of the at least one of the plurality of components of the power plant on the overall thermal performance of the power plant, normalize the performance impact to design conditions, and output at least one of the normalized performance impact on overall plant performance.

20 Claims, 7 Drawing Sheets

SYSTEMS AND METHOD FOR POWER PLANT PERFORMANCE RECONCILIATION

BACKGROUND OF THE INVENTION

The field of the invention relates generally to power plants, and more particularly, to systems and methods of modeling power plants.

Generally, known power plants include a number of major components. For example, known plants may include a gas turbine, a heat recovery steam generator, a steam turbine, and/or a condenser/cooling tower. To assess the performance of a power plant, the performance of each of the major components must be analyzed. For example, often power plants are assessed using modeling techniques. However, because the configuration and orientation of the major components used within a plant can vary from power plant to power plant, custom models for each power plant must be developed that take into account the specific configurations of the major components at each of the specific power plants being analyzed. As a result, developing plant specific models may be expensive and/or time-consuming.

To facilitate reducing costs as well as to provide a universal system, some known modeling systems have attempted to embed alternative configurations of some major components in a single model. However, such systems generally include a very complex model that often increases the time to solve the model, i.e., long convergence times.

BRIEF DESCRIPTION OF THE INVENTION

In one embodiment, a system for use in determining the overall performance of a power plant including a plurality of components includes a processor configured to generate a first reference model of the power plant and generate a first test matched measured model of the power plant. The processor is further configured to determine the performance impact of the at least one of the plurality of components of the power plant on the overall thermal performance of the power plant at design conditions.

In another embodiment, a computer-readable media includes program instructions which when executed by a processor cause the processor to perform the steps of generating a first reference model of the power plant using original specification data of the power plant and generating a first measured model of the power plant from measured performance data of at least one of a plurality of components of the power plant. The computer-readable media also includes program instructions for determining the performance impact of the at least one of the plurality of components on the overall thermal performance of the power plant by substituting design performance data of the at least one of the plurality of components in the first reference model with its measured performance data, transforming the performance impact of the at least one of the plurality of components into a normalized performance impact using the original specification data, and outputting at least one of the normalized plant performance impact and the performance impact.

In yet another embodiment, a method of modeling a power plant includes generating a first measured thermal model, generating a first reference thermal model, and determining a performance impact of at least one of a plurality of major components on an amount of power plant power generation. The method also includes normalizing the performance impact of the at least one of the plurality of major components to a design basis and displaying the normalized performance impact.

DETAILED DESCRIPTION OF THE INVENTION

The following detailed description illustrates embodiments of the invention by way of example and not by way of limitation. It is contemplated that the invention has general application to analytical and methodical embodiments of determining efficiencies of major power plant components and sub-components in industrial, commercial, and residential applications. It is noted that, while the present application is described with reference to combined cycle power plants, one of ordinary skill in the art will appreciate that the systems and methods described herein are not limited to any particular type of power plant.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
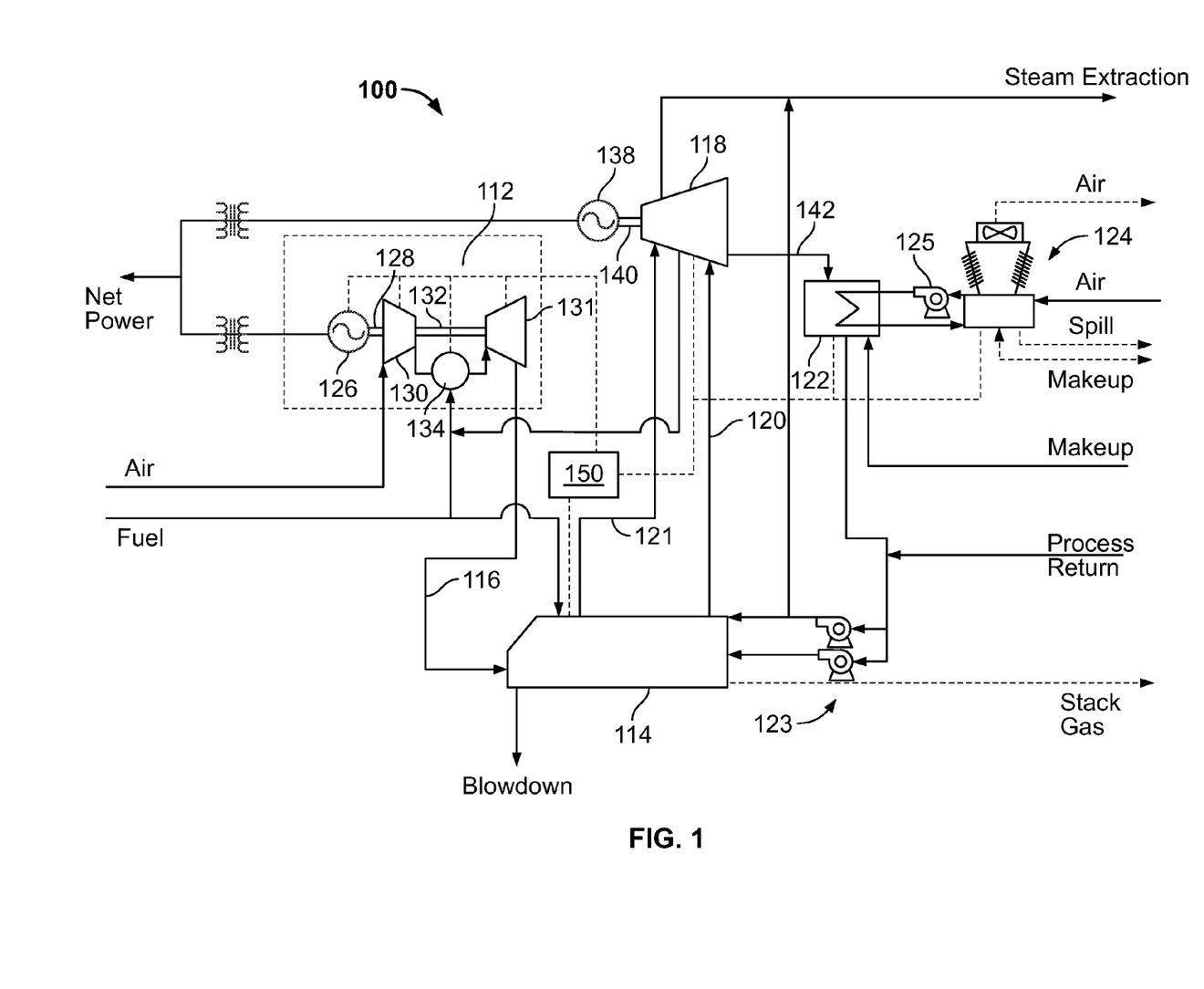
FIG. 1 is a schematic illustration of a combined cycle power plant in accordance with an exemplary embodiment of the present invention.

FIG. 1 is a schematic illustration of a combined cycle power plant 100 in accordance with an exemplary embodiment of the present invention. In the exemplary embodiment, power plant 100 includes a gas turbine engine 112 coupled in flow communication to a heat recovery steam generator (HRSG) 114 through an exhaust line 116. Exhaust gases exit gas turbine engine 112 and are directed to HRSG 114 through exhaust line 116. Steam generated by HRSG 114 is directed to a steam turbine 118 via steam lines 120 and 121. Steam turbine 118 exhausts spent steam to a condenser 122 where the steam is condensed into water that is channeled to feed pumps 123. Feed pumps return the water at high pressure to HRSG 114 to complete the steam cycle. Water circulating through tubes in condenser 122 is pumped from a basin of cooling tower 124 through condenser 122 and back to a tower of cooling tower 124 by circulating pumps 125 to complete the circulating water circuit.

In the exemplary embodiment, combined cycle power plant 100 also includes an electrical generator 126 that is coupled via a shaft 128 to gas turbine engine 112. Gas turbine engine 112 includes a compressor section 130 that is coupled to a turbine section 131 through a shaft 132. A combustor section 134 is coupled in flow communication between compressor section 130 and turbine section 131. Exhaust gases discharged from turbine section 131 through exhaust line 116 are channeled through passages in HRSG 114 where heat energy in the exhaust gases is transferred to water flowing through HRSG 114 and the water is converted into steam. Exhaust gases are then discharged from HRSG 114 and released to the atmosphere or to a pollution control device (not shown), and steam produced in HRSG 114 is routed to steam turbine 118 through steam lines 120 and 121. An electrical generator 138 is coupled to steam turbine 118 through a shaft 140. Spent steam is routed to condenser 122 and cooling tower 124 through a steam line 142 or an exhaust hood (not shown), and steam condensate is returned to HRSG 114 wherein it is re-heated to steam in a continuous cycle.

In the exemplary embodiment, power plant 100 is communicatively coupled to a data acquisition system (DAS) 150 for use in assessing the thermal performance of individual components of power plant 100, as described herein. In an alternative embodiment, DAS 150 comprises a computer that includes data acquisition hardware and executes data acquisition software. DAS 150 may be communicatively coupled to the power plant by any conventional wired or wireless link, thus enabling DAS 150 to be located within close proximity to power plant 100 and/or remotely therefrom. Thermal performance data of individual power plant components, such as components 112, 114, 118, 122, and 124, measured by DAS 150, are used as described in more detail below, to develop a thermal model that is substantially matched to performance test data of power plant 100. For example, measurements of compressor pressure, and/or combustion temperature, may be used to determine the thermal performance of gas turbine engine 112. Various sensors (not shown) may be located on or coupled to each power plant component for gathering data related to the respective power plant components and for forwarding the gathered data to DAS 150 for processing. Likewise, other criteria relevant to the determination of thermal performance of other components may be measured by DAS 150.

Figure 2:
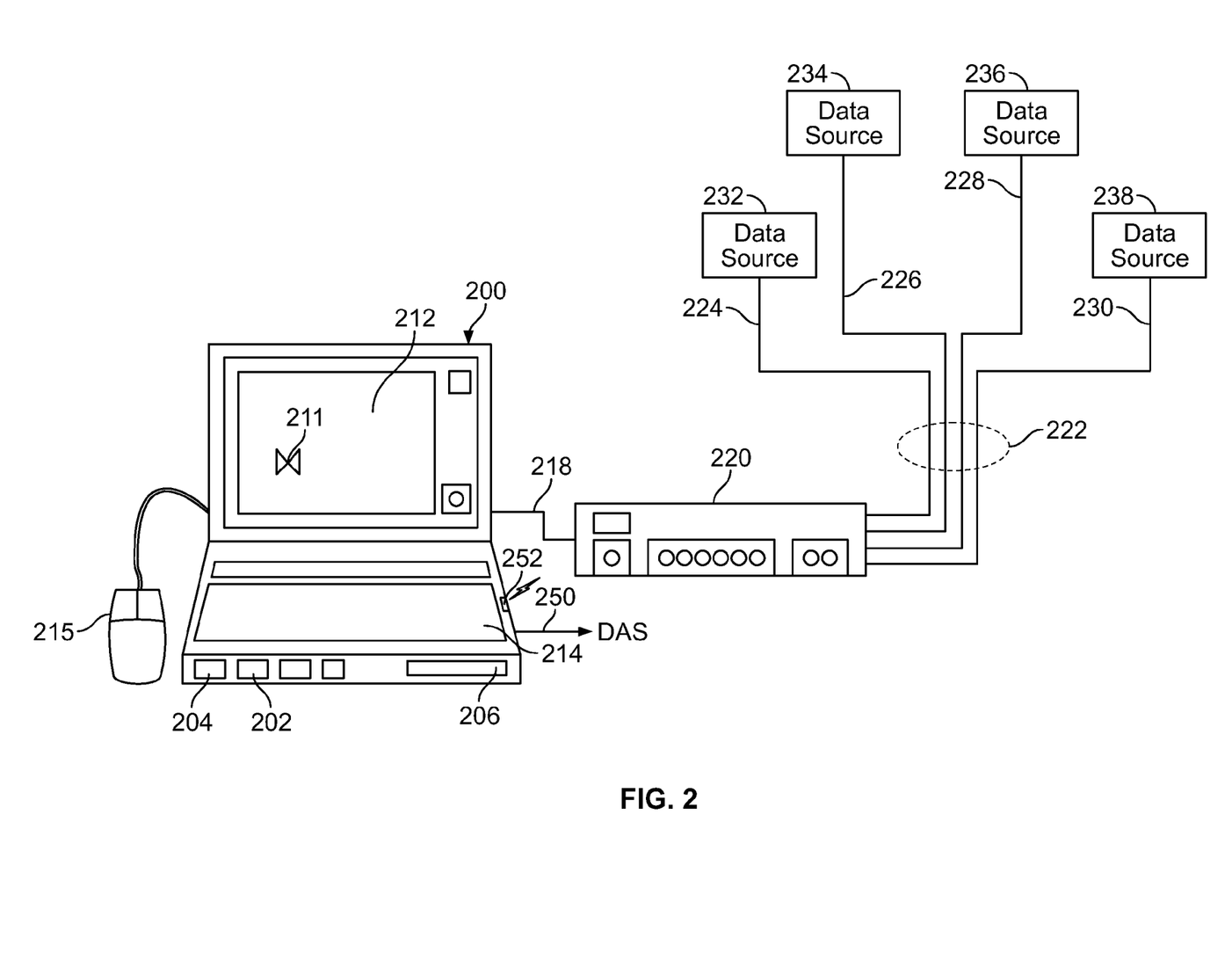
FIG. 2 is a perspective view of a laptop or other type of computer that may be used with the combined cycle power plant shown in FIG. 1 in accordance with an exemplary embodiment of the present invention.

FIG. 2 is a perspective view of a performance evaluation system (PES) 200 that may be used with combined cycle power plant 100 (shown in FIG. 1) in accordance with an exemplary embodiment of the present invention. PES 200 and its appropriate input/output ports 218, when provided with software configured to provide the functionality described herein, comprises a data acquisition system such as DAS 150. In the exemplary embodiment, PES 200 includes a processor 202 communicatively coupled to one or more memory devices 204 such as a random access memory (RAM), a read only memory (ROM), and one or more mass storage devices for reading and/or writing removable media such as a floppy disk drive, CD-ROM or CD-RW drive, or a DVD or DVD-RW drive such as a hard drive 206. In addition, PES 200 includes user interface devices, such as a display screen 212, a keyboard 214, and a mouse or other pointing device 215 (which may be built into the case of PES 200 rather than a separately attached device as shown in FIG. 2). Software included in some configurations of the present invention may be loaded, for example, from machine-readable media (examples of which are floppy disks, CD-ROMs, CD-RWs, DVDs, and the like) onto PES 200 using drive 206, or via a network interface or other type of data interface not shown in FIG. 1. In some configurations of the present invention, software is pre-loaded onto an internal storage device of PES 200, or may be loaded (or copied to internal storage) from a USB flash ROM storage device. In some configurations, a machine readable medium having instructions recorded thereon for acquiring data for thermal performance testing is supplied. The medium may comprise, for example, any of the removable and/or fixed storage media mentioned above, or other types of media. As used herein, the term "machine-readable medium" is intended to encompass configurations having a single medium or plural media, irrespective of whether the plural media are the same or different. As a non-limiting example, a "machine readable medium having instructions recorded therein for acquiring data for thermal performance testing" includes within its scope a configuration in which the instructions are spread across two floppy disks and a CD-ROM. In some configurations, PES 200 is a personal computer or a laptop computer, is portable and reconfigurable, so it can be moved and reconfigured to monitor different installations as needed.

PES 200, via one or more input/output ports 218 (for example, serial, parallel, universal serial bus (USB), Ethernet, etc.) is configured to communicate with one or more data sources 232, 234, 236, and 238 at a system installation. In some configurations, a network bridge 220 or other interface unit is provided to facilitate communication via a plurality of channels 222. In the sample configuration illustrated in FIG. 1, channels 222 comprise interconnections 224, 226, 228, and 230. As described above, some configurations of the present invention communicate via between one and several hundred channels. However, the invention is not limited to any particular number of channels, and no specific limit should be construed either from FIG. 1 or any example configuration described herein.

In various embodiments, PES 200 is configured to create a reference model and a measured model using a stored library of power plant components specifications. This library may be stored in memory device 204, hard drive 206, be accessed remotely, or stored in any other removable storage medium (not shown). A graphical user interface (GUI) 211 is displayed on screen 212 to permit a user to select individual components to be included in the thermal model. In some embodiments, GUI 211 is pre-populated with component names and dynamically links these names to the thermal model. In some embodiments, PES 200 is configured to act as a DAS while in others it is configured to operatively connect to a DAS, for instance, through either a wired connection 250 or a wireless connection 252.

Figure 3:
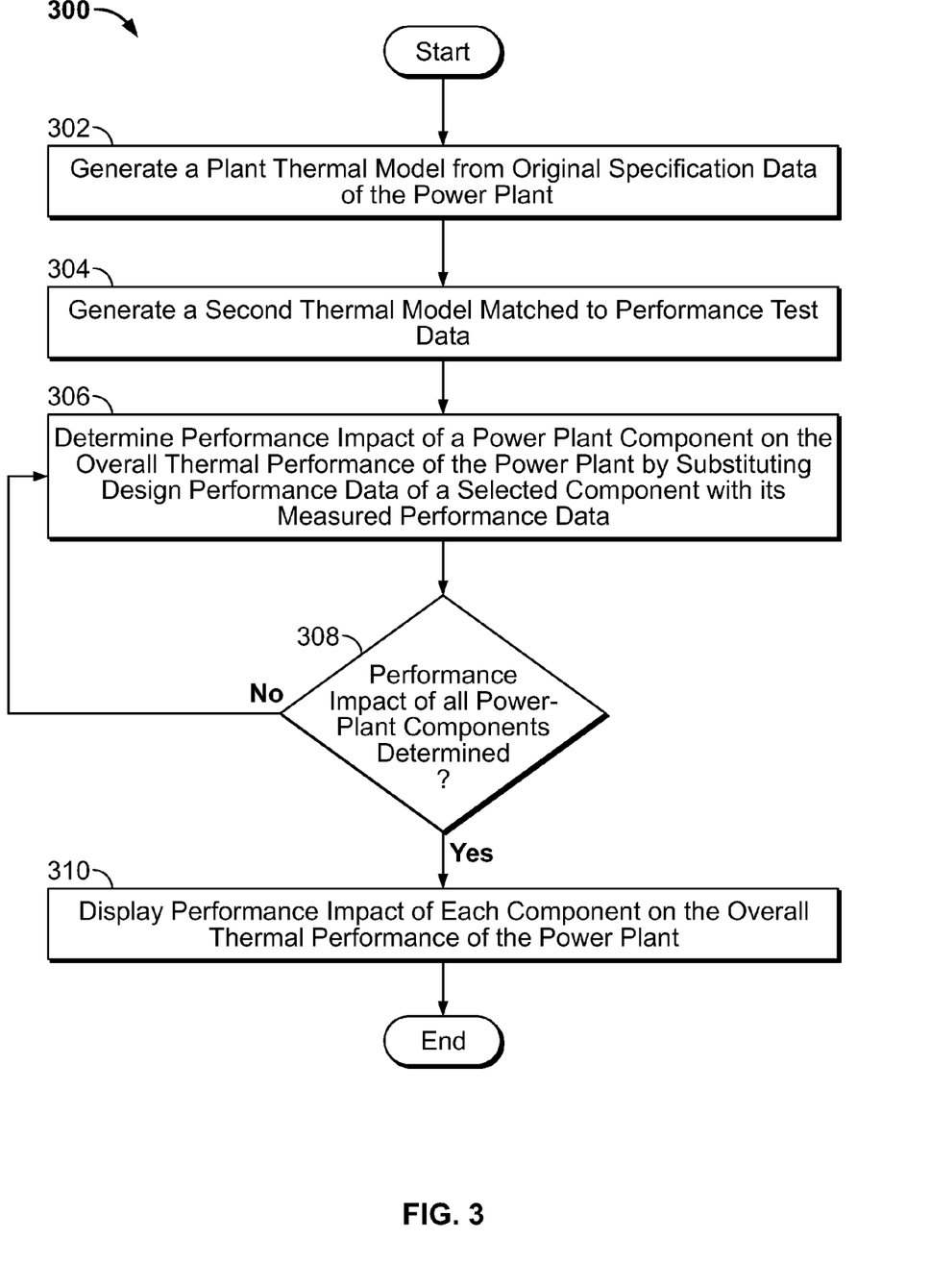
FIG. 3 is a flowchart of a method of evaluating a thermal performance of a power plant in accordance with an exemplary embodiment of the present invention.

FIG. 3 is a flowchart of a method 300 of evaluating a thermal performance of a power plant in accordance with an exemplary embodiment of the present invention. In the exemplary embodiment, method 300 is used to determine the performance impact of individual power plant components, such as gas turbine engine 112, heat recovery steam generator (HRSG) 114, steam turbine 118, condenser 122, feed pumps 123, and cooling tower 124 (shown in FIG. 1) on the overall thermal performance of power plant 100. Method 300 includes generating 302 a first thermal model of a power plant based on original specification data of each of a plurality of individual components included in a power plant analysis. Method 300 includes generating 304 a second thermal model of the power plant using measured thermal performance data of at least some of the plurality of individual components. The performance impact of a selected power plant component on the overall thermal performance of the power plant is then determined 306 by substituting measured thermal performance data of the selected component in place of the original specification thermal performance data of the selected component. A determination 308 is then made as to whether or not the performance impact of all of the plurality of individual components included in a power plant analysis has been calculated. If not, the performance impact of a next selected power plant component on the overall thermal performance of the power plant is repeated until the performance impact of all the selected power plant components has been determined. If the performance impact of each of the power plant components has been determined 308, the performance impact of the plurality of individual components in the overall thermal performance of the power plant is displayed 310 or output for further processing. Additionally, sub-components of the plurality of individual components may be selected and included in the analysis of the performance impact on the overall thermal performance.

Figure 4:
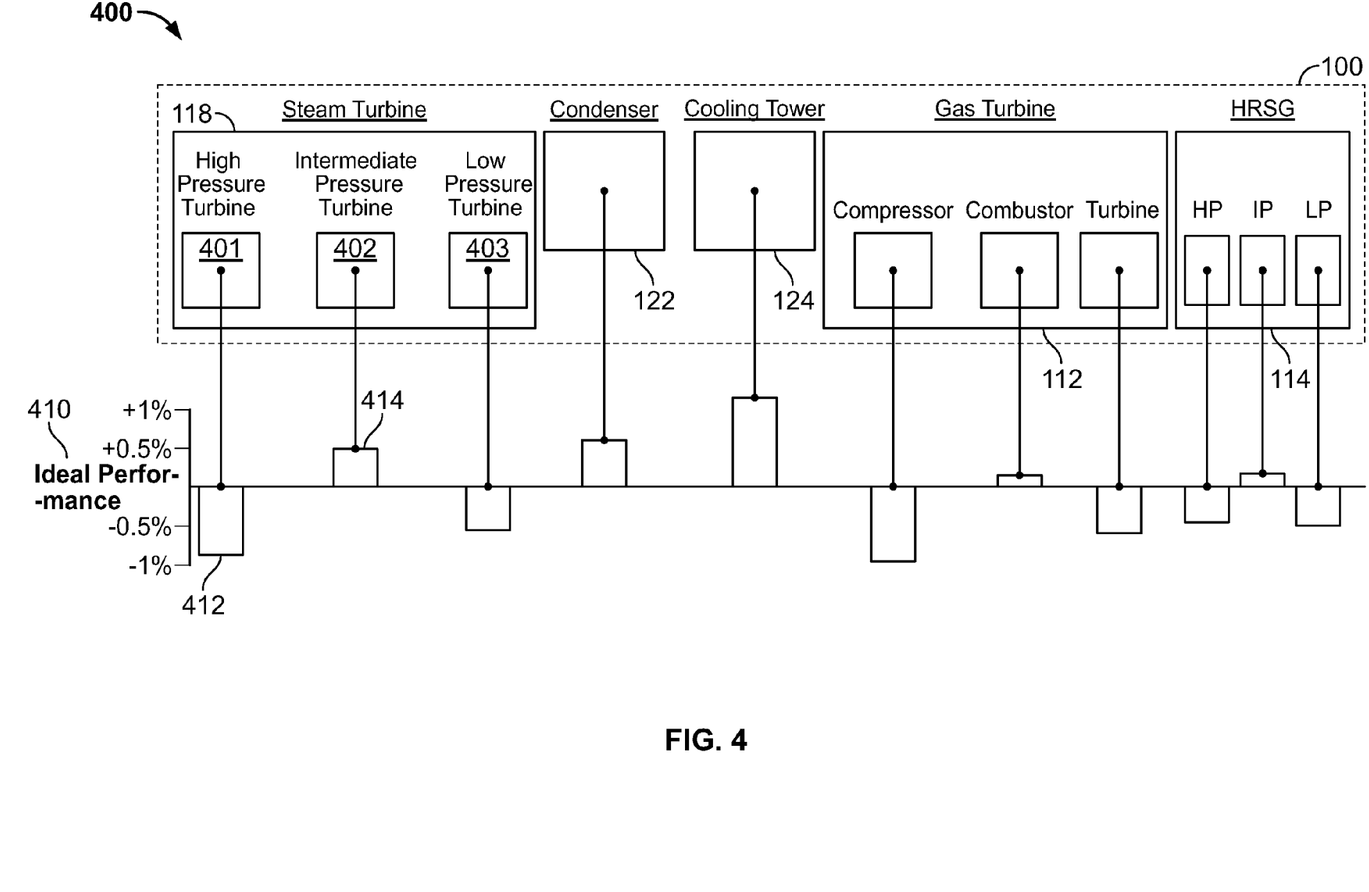
FIG. 4 is a schematic of an exemplary thermal model of a power plant such as power plant shown in FIG. 1 illustrating a comparison of thermal performance of various components and sub-components of the power plant, with corresponding ideal thermal performance values.

FIG. 4 is a schematic of an exemplary thermal model 400 of a power plant such as power plant 100 (shown in FIG. 1) illustrating a comparison of thermal performance of various components and component parts of the power plant, with corresponding ideal thermal performance values. Thermal model 400 is based on and designed from measured thermal performance data of an operating power plant. For example, in power plant 100, steam turbine 118 includes a high pressure turbine (HPT) 401, an intermediate pressure turbine (IPT) 402, and a low pressure turbine (LPT) 403. In the example, the thermal performance of each of HPT 401, IPT 402, and LPT 403 is measured and compared against ideal thermal performance values associated with each component. For example, in the exemplary embodiment, the design thermal performance for HPT 401, IPT 402, and LPT 403 is represented by a horizontal line 410, and measured thermal performance indicated at 412 of HPT 401 is at about −1% as compared to its ideal thermal performance, identified at baseline 410. The measured thermal performance identified at 414 of IPT 402 is about +0.5% as compared to its corresponding ideal thermal performance indicated at baseline 410. Additional comparisons may be made for other components of power plant 100 for use in determining the operational efficiency of each component relative to its ideal performance values.

For example, in the exemplary embodiment, the steam cycle output is re-calculated each time a new component is placed in service in the model to determine the individual component impact on plant performance. Finally, when all of the components have been implemented into the model, the impact of all of the components on the overall output of the plant are determined. More specifically, the impact of each component on the over plant output and heat rate are determined at measured boundary conditions. In one embodiment, the impact on output and heat rate are also determined at design conditions. In the exemplary embodiment, the data is graphically displayed for analysis. In other embodiments, the data may be displayed in other forms, and/or may be saved locally or remotely for later use.

Figure 5:
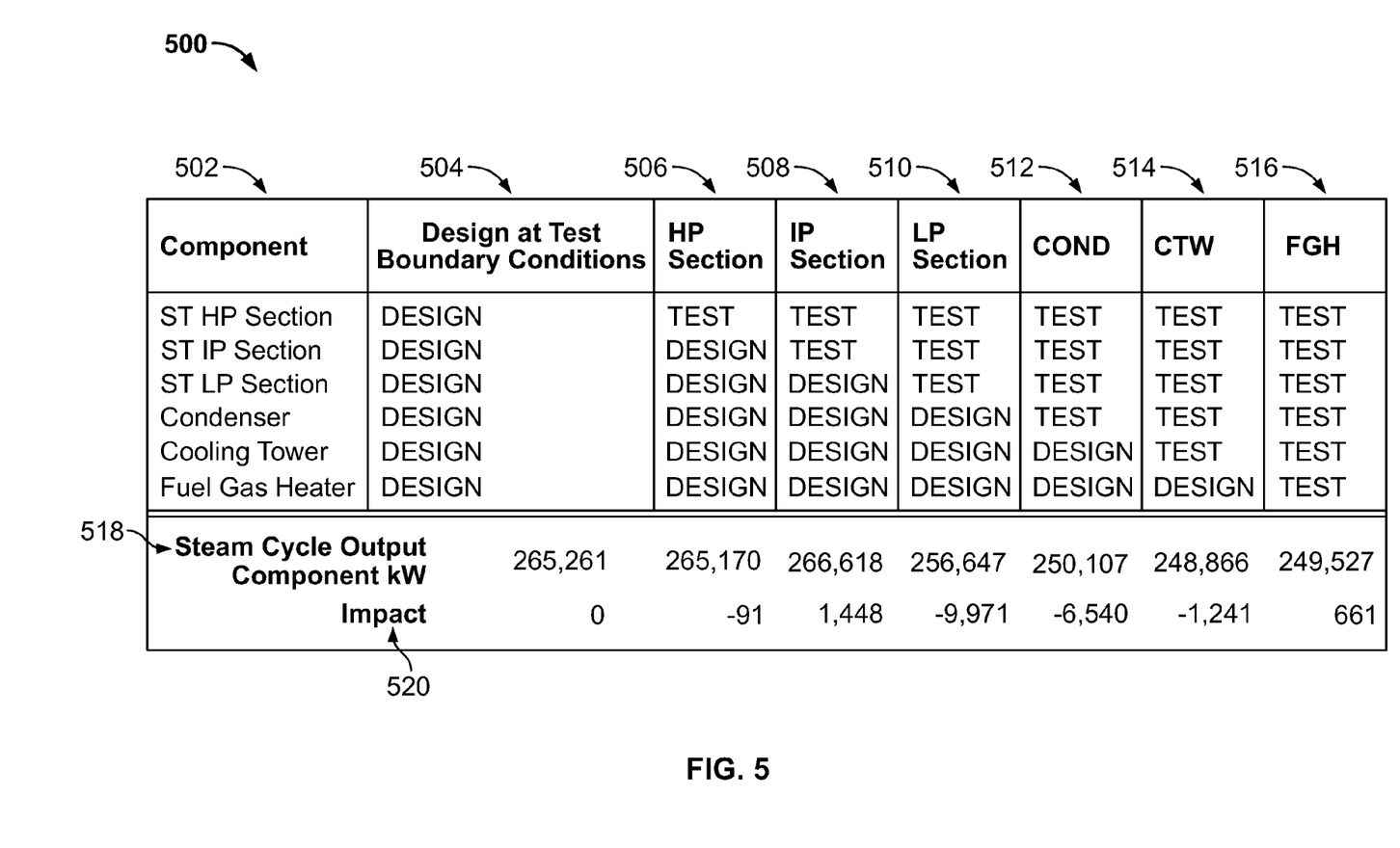
FIG. 5 is table illustrating a performance model output as each selected component performance is incrementally included in the performance model.

FIG. 5 is table 500 illustrating a performance model output as each selected component performance is incrementally included in the performance model. In the exemplary embodiment, table 500 includes a column 502 identifying selected components to be included in the model. Columns 504-516 to the right of column 502 identify whether for each increment the execution of the model is based on a design set of data or a measured or test set of data for each selected component. A first row 518 of output data quantifies the calculated steam cycle output for each execution of the model. A second row 520 of output data quantifies the calculated performance impact in kilowatts (kW) for each execution of the model when different components measured data is used in the calculation. For example, the steam cycle output for all selected components operating at their specified design performance ratings is indicated to be 265.261 megawatts (MW). Using measured data for the HP section of the steam turbine the steam cycle calculated output drops to 265.170 MW, a decrease of approximately 91 kW as indicated in row 520. Likewise, across rows 518 and 520, the performance impact of using the measured data for each selected component to calculate steam cycle output is shown.

Figure 6:
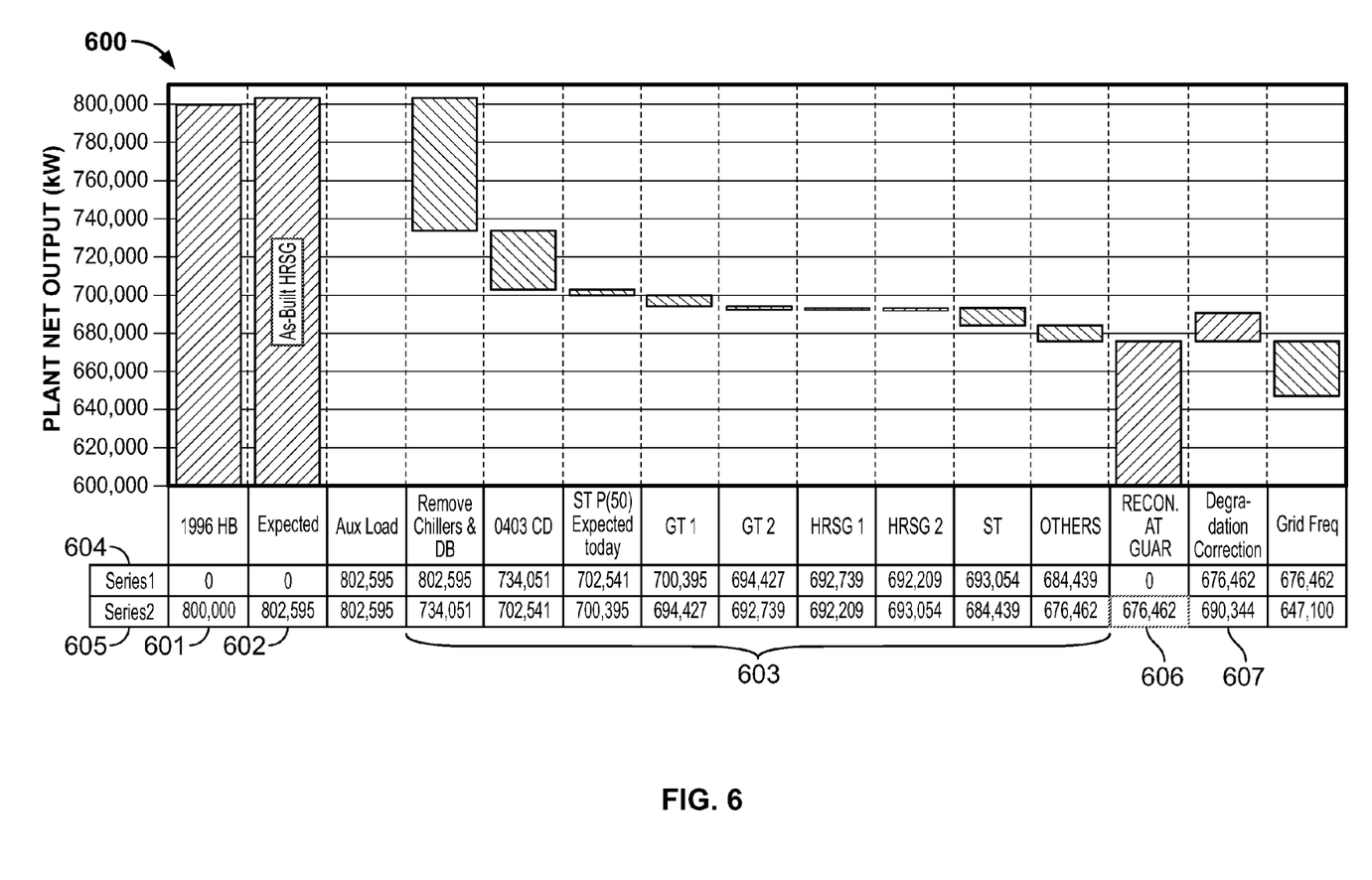
FIG. 6 is a gross reconciliation graph that may be used with the combined cycle power plant shown in FIG. 1 and that illustrates an expected plant power output.

FIG. 6 is a gross reconciliation graph 600 that may be used with system 150 and that illustrates an expected plant power output in, for example, kilowatts. Columns 601 and 602 represent a respective energy output expected at installation and an energy output expected when the test was run. Columns 603 represent individual power plant components and their impact on the power output of the plant. Each component included in column 603 has two values indicated at rows 604 and 605. Values in row 604 each represent an expected output from the power plant with the component performing at its rated capacity and performance, and values in row 605 each represent the power plant output based on the actual performance of the component. The difference between the values of the components in rows 604 and 605 is a measure of the influence the component is having on the overall performance of the power plant as compared to the plants design goals. For example, in the exemplary embodiment, Gas Turbine 1 (GT1) has a design value of 700,395 kW, shown in row 604, and an actual operating value of 694,427 kW, shown in row 605. As such, Gas Turbine 1 is producing approximately 6000 kW less in power generation than designed. Column 606 represents an actual measured power output of the plant under current operating conditions, and column 607 represents an estimated power loss due to degradation and fouling of power plant parts.

Figure 7:
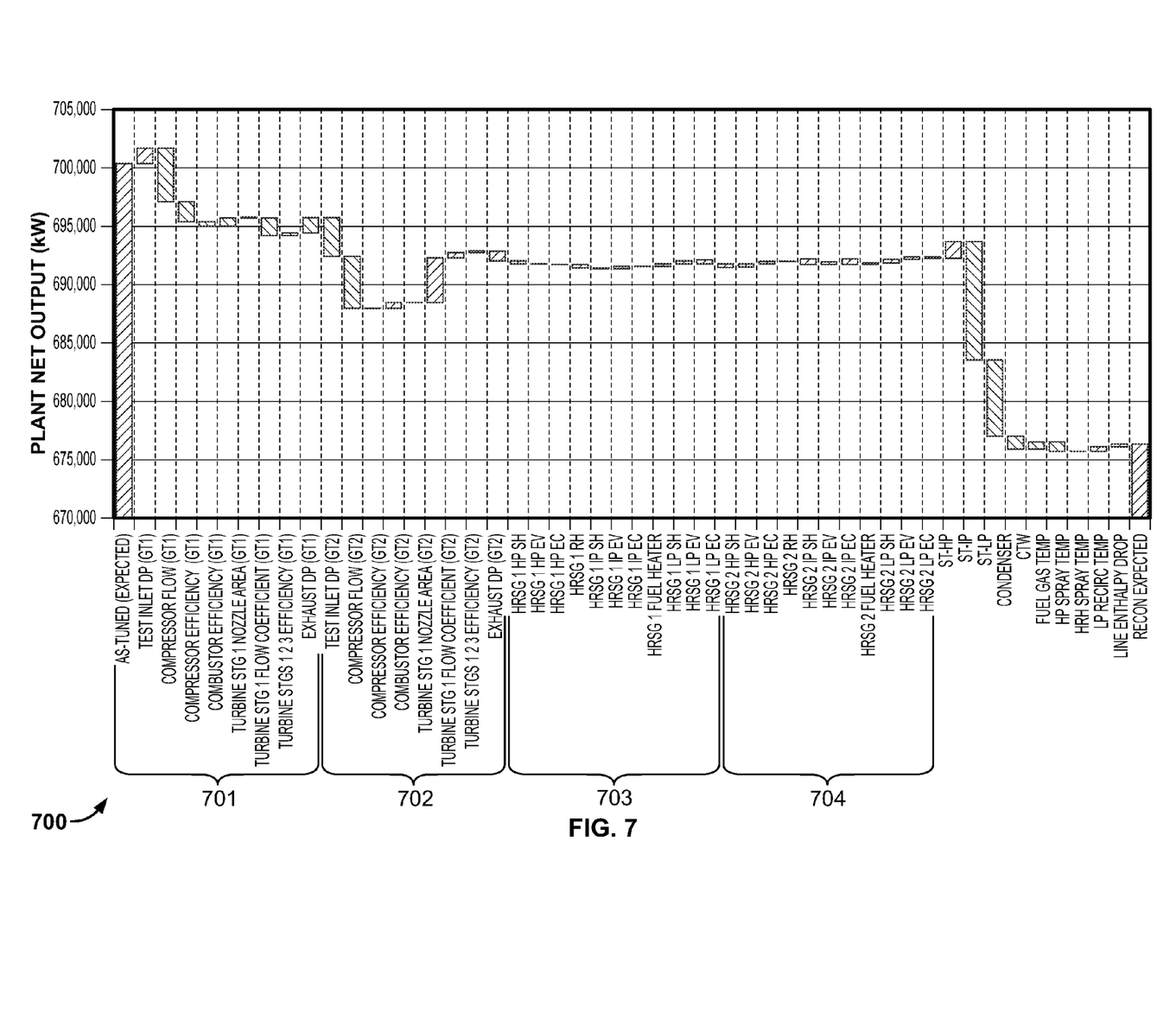
FIG. 7 is an exemplary detailed reconciliation graph that may be used with the combined cycle power plant shown in FIG. 1.

FIG. 7 is an exemplary detailed reconciliation graph 700 that may be used with system 150 (shown in FIG. 1). Graph 700 is similar to graph 600 (shown in FIG. 6), but rather than displaying the performance impact of only the main components of the power plant, graph 700 displays the impact of sub-components on the associated main components. For example, in the exemplary embodiment, sub-components of Gas Turbine 1 are indicated in a callout represented at 701. Callouts 702, 703, and 704 represent sub-components of Gas Turbine 2, heat recovery steam generator 1, and heat recovery steam generator 2, respectively. The sub-components illustrated are exemplary only, and graph 700 is not limited to only being used with the sub-components displayed.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 202, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes at least an improved ability to understand the contributions of individual plant components to the power plant output. The techniques described herein are particularly useful for determining efficiencies of major power plant components, and also be used to determine efficiencies of subcomponents. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A performance evaluation system for determining an overall performance of a power plant including a plurality of components, said system comprising a plurality of sensors communicatively coupled to a processor programmed to evaluate data received from the sensors, said processor configured to:
    generate a first reference model of the power plant using specification data for a plurality of process components included in the power plant;
    receive measured data from at least one of the plurality of sensors;
    generate a first measured model of the power plant using the measured data;
    determine the performance impact of the at least one of the plurality of components of the power plant on the overall thermal performance of the power plant;
    normalize the performance impact of the at least one of the plurality of components of the power plant to design conditions;
    determine the impact to plant output and heat rate of at least one of the plurality of components;
    generate a reconciliation graph using the determined performance impact of the plurality of components, the measured data, and the determined impact to plant output and heat rate; and
    output the reconciliation graph to a user.

2. A system in accordance with claim 1, wherein said processor is configured to generate the first reference model of the power plant using original specification data of the at least one of the plurality of components.

3. A system in accordance with claim 1, wherein said processor is configured to generate the first measured model of the power plant using measured data of the at least one of the plurality of components.

4. A system in accordance with claim 1, wherein said processor is configured to output at least one of the normalized performance impact and the performance impact to a visual display.

5. A system in accordance with claim 1, wherein said processor is configured to determine the performance impact of the at least one of the plurality of components of the power plant on the overall thermal performance of the power plant by substituting measured performance data of the at least one of the plurality of components into the first reference model with the original specification data of the at least one of the plurality of components.

6. A system in accordance with claim 5, wherein said processor is further configured to determine a performance impact of at least one sub-assembly of at least one of the plurality of power plant components by substituting measured performance data of the at least one sub-assembly into the first reference model for the original specification data of the at least one sub-assembly; and
    generate the reconciliation graph using the determined performance impact of the at least one sub-assembly.

7. A system in accordance with claim 1, wherein said processor is further configured to retrieve original specification data of the at least one of the plurality of components from an electronic database.

8. A system in accordance with claim 1, wherein said processor is further configured to retrieve measured performance data of the at least one of the plurality of components from the power plant.

9. A non-transitory computer-readable media including program instructions which when executed by a processor instruct the processor to:
    generate a first reference model of the power plant using original specification data of process components of the power plant;
    generate a first test matched measured model of the power plant from measured performance data of at least one of a plurality of components of the power plant;
    determine the performance impact of the at least one of the plurality of components on the overall thermal performance of the power plant by incrementally substituting design performance data of the at least one of the plurality of components in the first reference model with its measured performance data;
    transform the performance impact of the at least one of the plurality of components into a normalized component performance using original specification data; and
    output a reconciliation graph using the normalized component performance of the at least one of the plurality of components of the power plant and the determined performance impact of the normalized component performance on plant performance.

10. A non-transitory computer-readable medium in accordance with claim 9, further comprising instructions for displaying at least one of the normalized performance data and the performance impact of the at least one of the plurality of components.

11. A non-transitory computer-readable medium in accordance with claim 9 further comprising instructions for receiving measured performance data from the power plant.

12. A non-transitory computer-readable medium in accordance with claim 9 further comprising instructions for a database configured to store design performance data for power plant components.

13. A non-transitory computer-readable medium in accordance with claim 12 further comprising instructions for a graphical user interface pre-populated with component names and dynamically linked to the database.

14. A method of evaluating a performance of a power plant, the power plant comprising a plurality of major components including at least one of a steam generator, a steam turbine, a condenser, and a cooling tower, said method comprising:
   generating a first reference thermal model using specification data for the plurality of major components included in the power plant;
   generating a first measured thermal model using measured data received from at least one of a plurality of sensors associated with the plurality of major components and a processor programmed to receive data from at least one of the plurality of sensors;
   determining a performance impact of at least one of a plurality of major components on an amount of power plant power generation;
   transforming the performance impact of the at least one of the plurality of major components to a design basis into a normalized performance impact;
   determining an expected output at a rated capacity and performance for at least one of the plurality of major components;
   determining an actual output based on actual performance for at least one of the plurality of major components; and
   displaying a reconciliation graph using the normalized performance impact of the at least one of the plurality of components of the power plant, the expected output at a rated capacity and performance for at least one of the plurality of major components, and the actual output based on actual performance for at least one of the plurality of major components.

15. A method in accordance with claim 14 wherein generating a first measured thermal model further comprises generating a first measured thermal model using measured data of at least one of the plurality of major components.

16. A method in accordance with claim 14 wherein generating a first reference thermal model further comprises generating a first reference thermal model using original specification data of at least one of the plurality of components.

17. A method in accordance with claim 14 wherein displaying the normalized performance impact of the at least one of the plurality of major components further comprises displaying the normalized performance impact of the at least one of the plurality of major components graphically.

18. A method in accordance with claim 14 further comprising determining a performance impact of one sub-component of the at least one of the plurality of major components on a power plant amount of power generation.

19. A method in accordance with claim 14 wherein generating a first measured thermal model further comprises receiving measured component performance data from the power plant.

20. A method in accordance with claim 14 further comprising storing the normalized performance impact of the at least one of the plurality of major components.

* * * * *